W. F. ARNOLD.
SCREWS FOR KNOBS.

No. 171,078.            Patented Dec. 14, 1875.

Witnesses.

Wendell R. Curtis
John T. Peters

Inventor.

Wilbur F. Arnold
by Theo. G. Ellis, Atty.

UNITED STATES PATENT OFFICE.

WILBUR F. ARNOLD, OF WINTHROP, CONNECTICUT.

IMPROVEMENT IN SCREWS FOR KNOBS.

Specification forming part of Letters Patent No. 171,078, dated December 14, 1875; application filed October 25, 1875.

*To all whom it may concern:*

Be it known that I, WILBUR F. ARNOLD, of Winthrop, in the county of Middlesex and State of Connecticut, have invented certain new and useful Improvements in Screws for Knobs; and I do hereby declare that the following is a full, clear, and exact description thereof, whereby a person skilled in the art can make and use the same, reference being had to the accompanying drawings and to the letters of reference marked thereon.

Like letters in the figures indicate the same parts.

My invention relates to screws to be attached firmly to knobs or handles, for the purpose of being easily screwed into a door, drawer, or other object, to fasten them securely for use.

Heretofore screws have been fastened into knobs most commonly by placing a wooden bushing around the shank of a screw below the head, and then gluing the whole into an enlarged receptacle in the knob, the head of an ordinary wood-screw being generally flattened a little to prevent its turning readily before being used for this purpose. Other methods, such as double screws keyed into the knob, have been used, but, being more difficult and expensive to manufacture, have not been largely made use of.

My invention provides a cheap and permanent method of fixing the screw into the knob so that it cannot turn in its socket when screwed into any object, and cannot be easily withdrawn.

Figure 1:
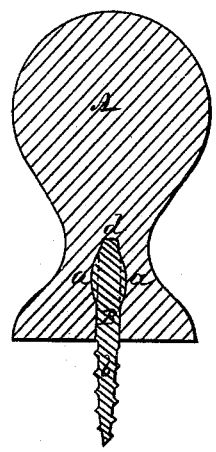
Figure 2:
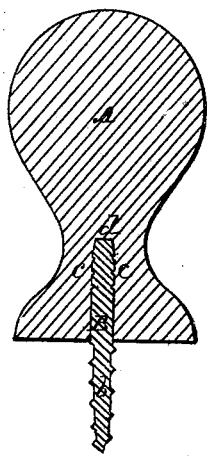
Figure 3:
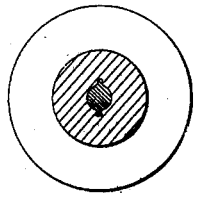

In the accompanying drawing, Figure 1 shows a section through a knob having my improved screw. Fig. 2 shows a section at right angles to that shown in Fig. 1. Fig. 3 shows a section through the upper part of the screw.

A is the knob, and B is the screw. $a\ a$ are two webs or wings upon the shank of the screw, struck up in a die or any other suitable manner. They serve the purpose of preventing the turning of the screw in the knob when the thread is screwed into the object to which the knob is to be attached. $b$ is the thread of the screw, which extends up to the wings $a$, so as to be partly within the knob. $c\ c$ are notches or teeth in the side of the screw-shank, to assist in preventing its being drawn out of the knob. The end $d$ of the shank is made taper, or reduced in size, so as to easily enter a hole bored in the knob rather smaller than the body of the shank. The screw is inserted in the knob by placing the small end $d$ in the hole in the wood or other material of which it is formed, and then pressing or driving in the shank of the screw to the proper depth. The wood presses upon and partially fills the upper threads of the screw and the serrations $c$, so as to hold the screw firmly in the knob. A little glue is commonly used, which holds the screw so firmly that it cannot be withdrawn without breaking the metal or splitting the wood.

What I claim as my invention is—

1. A headless gimlet-pointed wood-screw, with wings $a\ a$, serrations $c\ c$, and reduced end $d$, as a new article of manufacture.

2. A headless screw, B, with wings $a\ a$ upon the shank at the upper end of the thread, in combination with a knob, A, substantially as described.

WILBUR F. ARNOLD.

Witnesses:
GIDEON ROBINSON,
HENRY S. WALTER.